United States Patent [19]

Stoops

[11] 4,018,469
[45] Apr. 19, 1977

[54] GATE LATCHING MECHANISM FOR HOIST HOOK
[75] Inventor: Bobby G. Stoops, Tulsa, Okla.
[73] Assignee: Don R. Hinderliter, Inc., Tulsa, Okla.
[22] Filed: Oct. 28, 1975
[21] Appl. No.: 626,356
[52] U.S. Cl. ............... 294/82 R; 24/241 PP;241 SB
[51] Int. Cl.² ............................................ B66C 1/36
[58] Field of Search ............ 294/78 R, 82 R, 83 R, 294/83 A, 83 AB; 24/241 R, 241 P, 241 PP, 241 PS, 241 SB, 241 PL, 230.5 S, 230.5 SA; 59/93, 95, 86

[56] References Cited
UNITED STATES PATENTS

| 2,196,460 | 4/1940 | Hertel | 294/82 R |
|---|---|---|---|
| 2,905,997 | 9/1959 | Ramskill | 24/241 PP |
| 2,927,358 | 3/1960 | Ratcliff | 294/82 R |
| 3,003,214 | 10/1961 | Geraghty | 294/82 R |
| 3,548,465 | 12/1970 | Workman | 24/241 SB |
| 3,653,102 | 4/1972 | Crook, Jr. | 294/82 R |
| 3,827,746 | 8/1974 | Byers | 24/241 PP |

Primary Examiner—James B. Marbert
Attorney, Agent, or Firm—William S. Dorman

[57] ABSTRACT

A gate latching mechanism comprising a gate for closing the mouth of a hoist hook. The gate is attached to the hook and pivotally movable out of the mouth of the hook about a substantially vertical pivot axis spaced from the central axis of the stem of the hook. A spring which is located at the pivot axis biases the gate to swing to an open position. The free end of the gate is provided with a latch which, when closed, covers the tip of the hook, a lock which holds the latch engaged with the tip until the lock is manually released, and a locking spring for moving the lock to the locked position when the latch is moved to engage the tip.

6 Claims, 9 Drawing Figures

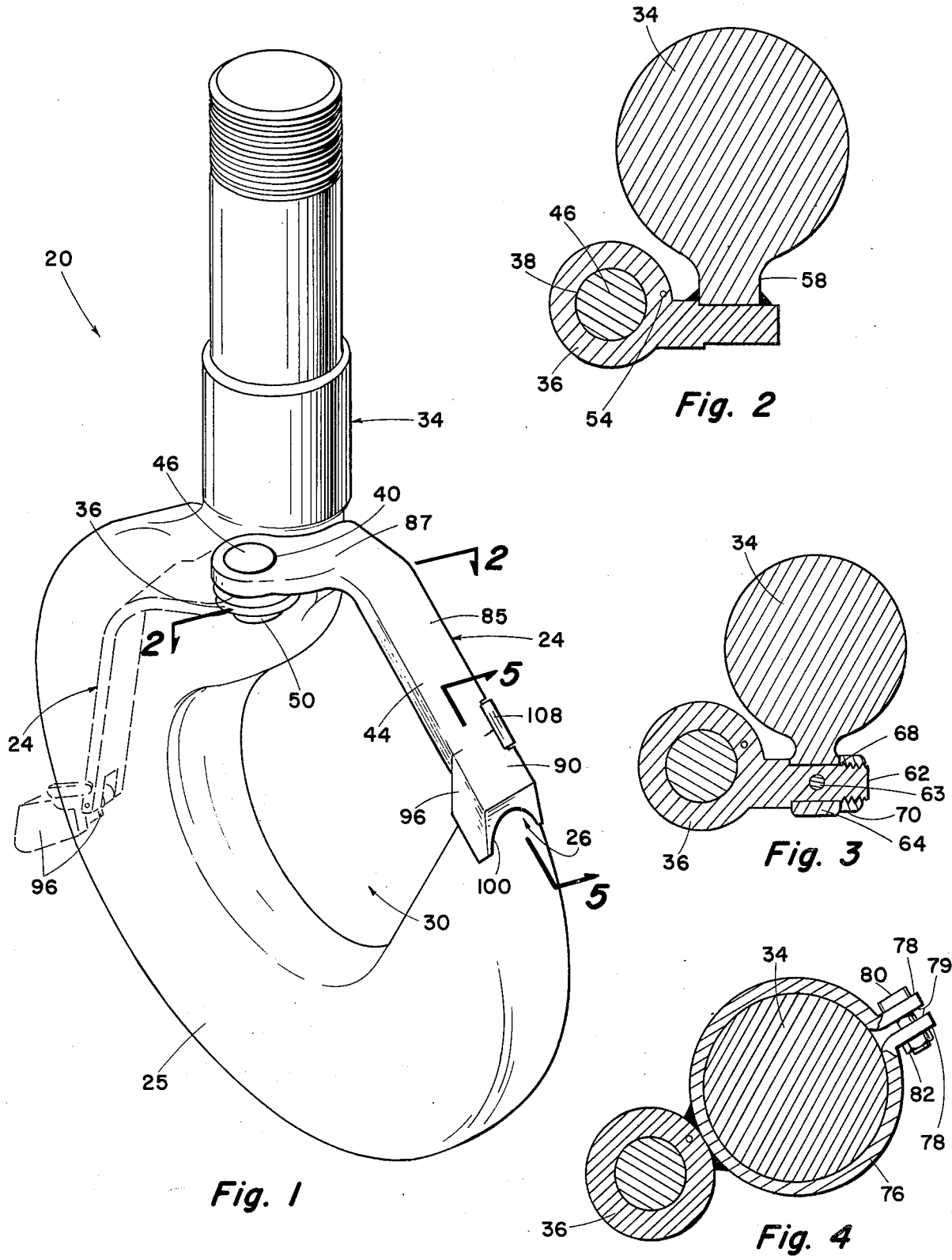

GATE LATCHING MECHANISM FOR HOIST HOOK

BACKGROUND OF THE INVENTION

1. Field of the Invention

The present invention relates to a gate for a hook. More particularly, the present invention relates to a hoisting hook provided with a locking gate which closes the mouth of the hook.

2. Description of the Prior Art

Reference is made to the following U.S. patents as typifying the structure of gates for hooks: Ratcliff U.S. Pat. No. 2,796,651, Geraghty U.S. Pat. No. 3,003,214, and Crook U.S. Pat. No. 3,575,458. The Ratcliff patent shows and describes a lockable gate which is pivotally movable about the stem (shank) of the hook for movement out of the mouth of the hook. The gate is attached to the stem by a sleeve and is pivotal about the central axis of the stem. The gate is provided with a cap which engages the tip of the hook automatically when the gate is closed and has a lock (in the second embodiment) which is automatically locked when the cap engages the tip. The Geraghty patent shows another gate having a lock and a sleeve, which is rotatable about the central axis of the stem. In the Crook patent, a gate is shown and described which is pivotally movable about a horizontal pin through the stem of the hook. The gate rotates from the tip toward the stem. A part of the gate will remain in the mouth of the hook. All three patents show the sides of the tip engaged by appendages extending from the arm of the gate to prevent the gate from moving laterally.

The prior constructions, which are laterally movable out of the mouth of the hook, pivot for movement out of the mouth about the sleeve which attaches the gate to the stem. Because of this sleeve, the prior gate constructions have proved practical only for smaller hooks.

SUMMARY OF THE INVENTION

The present invention involves a hook, for example, an eye or shank hoisting hook, which has a gate to close the mouth of the hook. The gate is mounted on the stem of the hook and is pivotal about an axis which is substantially parallel with the vertical axis of the stem and spaced from the stem.

The gate is comprised of a mounting structure which attaches the gate to the stem as described above, an arm pivotally mounted on the mounting structure, a spring biasing the arm in relation to the mounting structure, for example, to the open position across the mouth, a latch attached to the free end of the arm, and a lock also located at the free end of the arm.

The latch is provided with appendages (one on either side of the latch perpendicular to the gate's rotation with respect to the tip of the hook) which, when in contact with the tip, restrain the gate from opening.

The lock has a lever for manually moving the lock to the unlocked position when it is desirable to disengage the latch and a locking spring which biases the lock towards the locked position. When the latch is moved to engage the tip, the latch is automatically locked into the engaged position. While the latch is engaged with the tip, the gate forms a smooth continuous bridge which allows slack load lines to traverse without snagging.

BRIEF DESCRIPTION OF THE DRAWINGS

FIG. 1 is a view in perspective of a hook which includes a latch mechanism constructed according to the present invention;

FIG. 2 is a cross-sectional view, on a slightly enlarged scale, taken along section line 2—2 of FIG. 1;

FIG. 3 is a cross-sectional view similar to FIG. 2 showing a modified means of attachment of the gate arm to the stem of the hook;

FIG. 4 is a cross-sectional view similar to FIG. 2 showing a further modification of the attachment of the gate arm to the stem of the hook;

DETAILED DESCRIPTION OF THE PREFERRED EMBODIMENT

Figure 9:
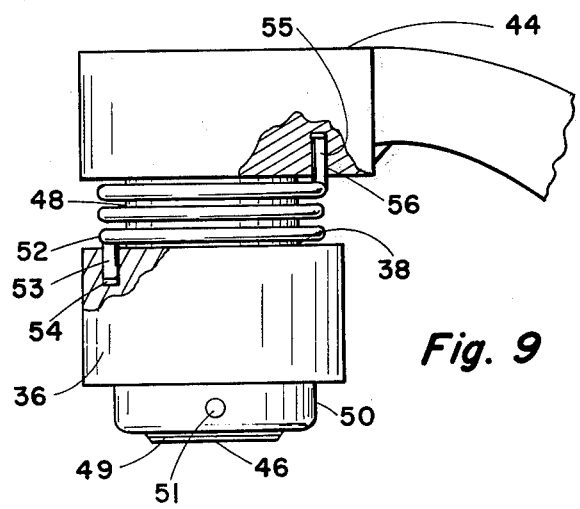
FIG. 9 is a fragmentary view of the mounting structure with portions broken away to reveal internal details.

FIG. 1 shows a typical threaded shank hoisting hook 20 on which is mounted a gate generally designated by the reference numeral 24. The hoisting hook 20 has a C-shaped body 25 with a tip 26, a mouth 30, and a stem 34. A mounting structure 36 is attached to the stem 34 offset from the line between the stem 34 and the tip 26 so that gate 24 may be moved out of the mouth 30 (shown by dotted lines in FIG. 1). The mounting structure 36 is provided with an alignment hole 38 (FIG. 2). The gate includes an arm 44 which has an alignment hole 40 (FIG. 1) slightly larger than the hole 38. A threaded bolt 46 (FIG. 9) having an enlarged upper portion 48 extends through arm 44. The upper portion of the threaded bolt 46 can be secured to the arm 44 by welding, for example. The lower threaded portion 49 of bolt 46 passes through mounting structure 36 so that the lower end or shoulder or the enlarged portion 48 rests against the top of the mounting structure 36 to maintain the arm 44 in spaced relation above the mounting structure 36. A nut 50 is received on the lower portion 49 of the bolt 46. A drive pin or locking pin 51 passes through the nut 50 and bolt 46 for preventing the nut from rotating on the bolt. Thus, a pivotal bearing is formed whose axis is parallel to the axis of the stem 34. A helical spring 52 (FIG. 9) is coiled around enlarged portion 48 of the bolt 46 between the mounting structure and the arm 44. One end 53 of spring 52 is received in the opening 54 in mounting structure 36, and the opposite end 55 of spring 52 is received in an opening 56 in arm 44. The spring 52 axially biases the arm 44 to the open position.

As shown in FIG. 2, the mounting structure 36 is formed as an integral part of the stem 34 by welding the same to a rib 58 protruding from the stem 34.

FIG. 3 shows a second embodiment of the mounting structure 36 provided with an integral threaded bolt 62. The stem 34 has a boss 64 with a suitable hole 68 in which the bolt 62 is received. A suitable nut 70 is provided for tightening the mounting structure 36 to the boss 64. Drive pin 63 passes through the boss 64 and bolt 62 and holds bolt 62 from rotating in the boss 64.

In FIG. 4, which shows a third embodiment of the mounting structure 36, the mounting structure 36 is provided with a clamp 76. The clamp 76 has a pair of apertured ears 78. The ears 78 are in a juxtaposed relationship around the stem 34. An alignment hole 79 is provided in each ear 78 so that a suitable bolt 80 and nut 82 may tighten the clamp 76 around the stem 34.

The arm 44 has a dogleg shape formed by a long member 85 (FIG. 1) which is essentially coextensive with the line between the stem 34 and the tip 26 (when the gate 24 is closed) and a short member 87 which is arcuate and which is attached to the mounting structure 36 (as discussed above). The long member of arm 44 slopes toward the tip 26. A latch 90 is located at the free end of the arm 44.

Figure 7:
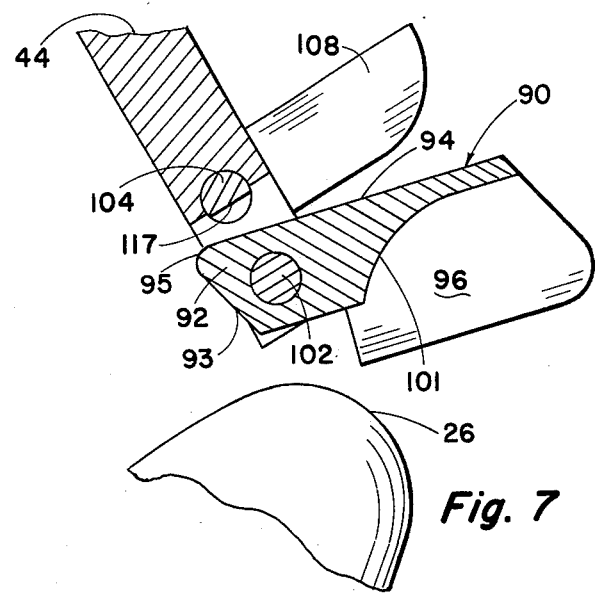
FIG. 7 is a cross-sectional view similar to FIG. 5 but showing the latch in the open position with respect to the tip of the hook.

The arm 44 has a rectangular shaped notch 91 (FIG. 6) at its free end. One end of latch 90 has a rectangular shaped projecting part 92 which fits into the rectangular shaped notch 91. The rear surface 93 (FIG. 7) of rectangular shaped part 92 and the top 94 of latch 90 converge to form a rounded, generally V-shaped nib or latch tip 95. The latch 90 is hollowed to form two parallel and vertical ears 96 or appendages (FIGS. 1 and 7) which are parallel to the sides of the arm 44 and which engage the sides 97 (FIG. 5) of the tip 26. The hollowed underneath portion 101 (FIG. 5, 7, and 8) of latch 90 has an arcuate shape generally conforming to the shape of the tip 26. The appendages 96, and the rear underneath portion 101 of the latch 90 form a cap for tip 26.

The latch 90 is pivotal about pin 102 (FIG. 6) which extends through the arm 44 and projecting part 92. The pin 102 supports the latch 90 in realtion to the tip 26 so that the latch and its appendages 96 may be brought in close contact with the tip 26.

Figure 5:
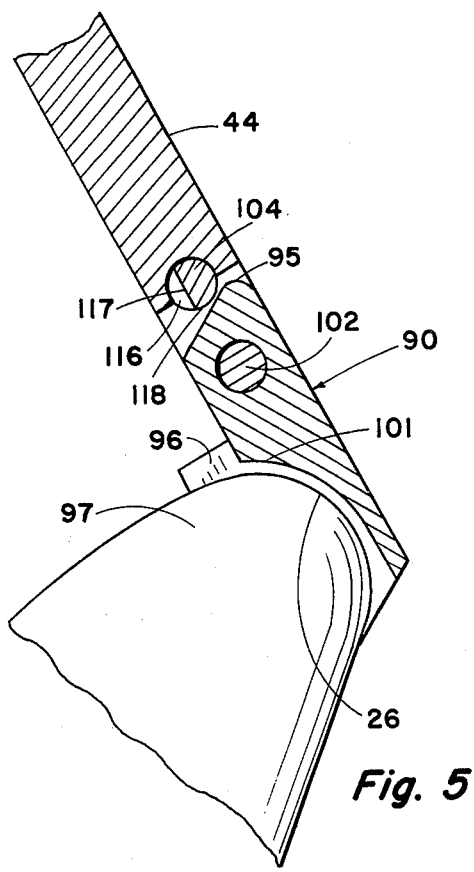
FIG. 5 is a partial cross-sectional view, on an enlarged scale, taken along section line 5—5 of FIG. 1 showing the latch in the closed position against the tip of the hook.
Figure 6:
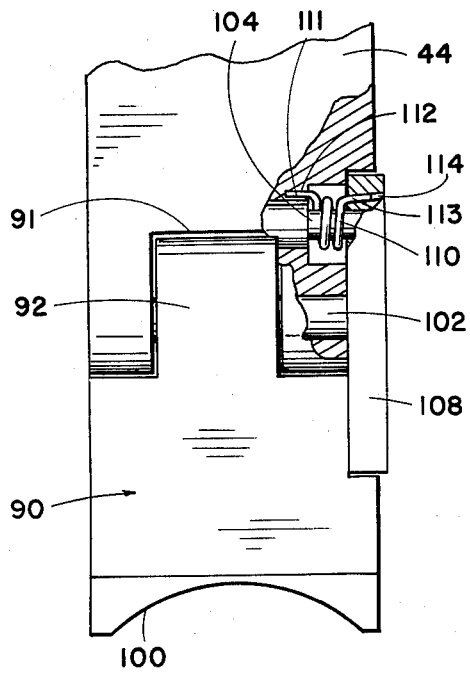
FIG. 6 is a top view of the latch and lock shown in FIG. 5 with portions broken away to reveal internal details.

The latch 90 is locked into engagement with the tip 26 by a rotatable cam pin 104 (FIGS. 5 to 8) which is received in the arm 44. A lever 108 is attached to one end of the cam pin. The top surface of the lever 108 is flush with the top surface of the arm 44 and latch 90 when in the locked position (FIG. 5). A helical locking spring 110 (FIG. 6) coiled around pin 104 axially biases the cam pin 104 in the locked position. One end 111 of the locking spring 110 is received in an opening 112 in arm 44 while the other end 113 of the spring 110 is received in an opening 114 in the lever 108.

The cam pin 104 has a cut out portion 116 (FIG. 5) which provides a flat surface 117 and a resulting D-shaped cam portion 118 in that portion of the cam pin which crosses the rectangular notch 91. As indicated heretofore, the tip 26 of the hook is covered by the latch 90 in the locked position (FIG. 5). The latch is locked because, if one were to attempt to lift the latch 90 from the FIG. 5 position, the tip 95 would engage the solid portion 118 of the cam pin 104 to prevent rotation of the latch 90 around the latch pin 102. Thus, the gate 24 is restrained from opening laterally bacause the appendages 96 engage the tip sides 97 preventing arm 44 from rotating about mounting structure 36. The latch 90, lever 108, and arm 44 form a smooth bridge which allows a slack load line to traverse without snagging.

To disengage the latch from the locked position (FIG. 5), lever 108 is first rotated until the flat surface 117 is perpendicular to the latch 90. Now, the latch 90 can be rotated about pin 102 to the fully open position (FIG. 7), because the tip 95 can now clear the cam pin 104 in a downward direction. The gate 24 can then be rotated out of the mouth 30 about mounting structure 36 to the gate open position (FIG. 1, dotted lines) by spring 52.

When the lever 108 is released from the fully open position of the latch (FIG. 7), the lever will rotate downwardly until the cam 104 engages the latch 90. If the latch 90 is also released, it will drop by gravity until the latch tip 95 engages the flat surface 117, resulting in the partly open position of the latch as shown in FIG. 8.

Figure 8:
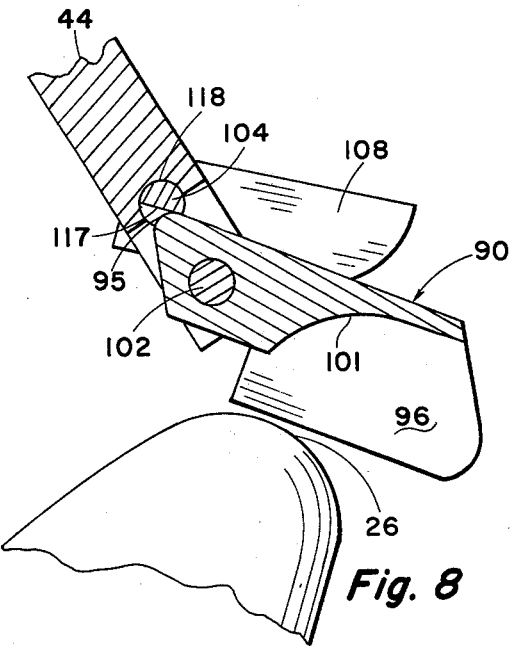
FIG. 8 is a cross-sectional view similar to FIG. 5 but showing the latch in the open position.

Assuming that the latch is in the condition shown in FIG. 8, if it is desired to employ the gate latch 24 to close the mouth of the hook, as shown in FIGS. 1 and 5, the gate 24, or arm 44, is rotated until the arm 44 is disposed over the mouth 30. Thereafter, the latch 90 is rotated manually about the pin 102 by pressing down on the latch. As the latch 90 is forced downwardly, the latch tip 95 will be urged against the flat surface, forcing the cam pin 104 to rotate in a counter-clockwise direction (with respect to FIG. 8) to lift the locking lever 108 upwardly until the flat surface 117 approaches the position shown in FIG. 7 (but not quite that far) at which time the lever tip 95 can pass beyond, or clear of, the cam pin 104. Now the latch 90 can engage or cover the tip 26. However, the locking spring 110 will immediately thereafter rotate the cam pin 104 and the lever 108 to the locked position (FIG. 5).

Although spring 52 is described as biasing the arm 44 toward the gate open position, spring 52 can easily be reversed so that the arm 44 is biased to the closed position.

SUMMARY OF OPERATION

The gate is opened by manually moving a cam to an unlocking position. The latch is then moved at the same time to its position, disengaging the latch from the tip of the hook. The gate may then be swung out of the mouth of the hook.

When it is desired to lock the gate closing the mouth, the gate is moved over the mouth and the latch manually engaged with the tip. The latch will be automatically locked into the engaged position.

Whereas the present invention has been described in particular relation to the drawings attached hereto, it should be understood that other and further modifications, apart from those shown or suggested herein, may be made within the spirit and scope of this invention.

What is claimed is:

1. A gate latching mechanism for a hook of the type having a stem and a bight terminating in a tip spaced from said stem to form a mouth; said gate latching mechanism including an arm having one end thereof pivotally connected to said stem and rotatable about a first pivot axis spaced from and parallel with the central axis of said stem for movement of said arm towards and away from a position over the mouth of said hook, said arm having an opposite free end engagable with said tip for closing the mouth of said hook for preventing a load line placed within said hook from slipping out of said hook; said arm including a latch pivotally mounted on the free end of said arm and movable towards said tip for engaging the sides thereof and for restraining said arm from moving to open the mouth of said hook; a locking means mounted on said arm and engagable with said latch for locking said latch in its tip-engaging position; said latch being pivotally mounted in said arm on a second and transverse pivot axis such that the portion of said latch which engages said tip is on the side of the second pivot axis away from said arm; a cam included in said locking means mounted in said arm and rotatable about an axis substantially parallel to the second pivot axis and on the side of the second pivot axis toward said arm; a nib on said latch projecting towards said cam for engaging said cam; said cam being rotatable in a given rotary direction to permit said nib to pass said cam whereby said latch can be pivoted out of engagement with said tip; a lever included in said lock means connected to said cam for manually rotating said cam to permit said nib to pass; and a locking spring biasing said cam in a rotary direction opposite to said given rotary direction for engaging said nib.

2. A gate latching mechanism as set forth in claim 1 wherein the top edge of said lever is flush with the top surface of said latch when said latch is obstructed from pivotal movement by said cam and wherein said latch is provided with a recess forming a cap extending over said tip to cover said tip, and wherein the top surface of said latch is in the same plane with the top surface of said arm forming a smooth continuous bridge when said latch is engaged with said tip for allowing a slack load line to traverse said arm and said tip without snagging.

3. A gate latching mechanism for a hook of the type having a stem and a bight terminating in a tip spaced from said stem to form a mouth; said gate latching mechanism including an arm having one end thereof pivotally connected to said stem and rotatable about a first pivot axis spaced from and parallel with the central axis of said stem for movement of said arm towards and away from a position over the mouth of said hook; said arm having an opposite free end engagable with said tip for closing the mouth of said hook for preventing a load line placed within said hook from slippng out of said hook; said arm being provided with a rectangular shaped notch at its free end, a D-shaped cam rotatably mounted in the free end of said arm and extending transversely across said notch, said cam being provided with a flat surface and an arcuate surface extending parallel to the central axis of said cam, a locking spring biasing said cam for rotation in a first rotary direction around its central axis towards a locking position for said cam, a lever attached to said cam for rotating said cam opposite to the bias of said locking spring towards an unlocked position for said cam, a latch pivotally mounted on said arm for engaging said tip and provided with an appendage on each side thereof extending downwardly for engaging the sides of the tip to restrain said arm from rotating to open the mouth of said hook, and a rectangular shaped projection on said latch fitting into said rectangular shaped notch and provided with nib adjacent said cam, said nib being engaged by said arcuate surface of said cam in the locking position thereof for preventing said latch from rotating when a force is exerted thereon tending to remove said appendages from engagement with said tip, said lever being rotatable against the bias of said locking spring to move said cam to its unlocked position wherein said flat surface is moved to permit said nib to pass said cam for allowing said latch to be rotated thereby removing said appendages from engagement with said tip.

4. A gate latching mechanism as set forth in claim 3 wherein said spring biases said arm to swing said arm opening said mouth.

5. A gate latching mechanism as set forth in claim 4 wherein said arm is a dogleg shape composed of an arcuate member pivotally attached to said stem and a straight member attached to said arcuate member and wherein said straight member is coextensive with the mouth of said hook for closing the mouth of said hook.

6. A gate latching mechanism for a hook of the type having a stem and a bight terminating in a tip spaced from said stem to form a mouth; said gate latching mechanism including an arm having one end thereof pivotally connected to said stem and rotatable about a first pivot axis spaced from and parallel with the central axis of said stem for movement of said arm towards and away from a position over the mouth of said hook; said arm having an opposite free end engagable with said tip for closing the mouth of said hook for preventing a load line placed within said hook from slipping out of said hook; said arm including a latch pivotally mounted on the free end of said arm and movable towards said tip for engaging the sides thereof and for restraining said arm from moving to open the mouth of said hook; a locking means mounted on said arm and engagable with said latch for locking said latch in its tip-engaging position; said arm having a dogleg shape composed of an arcuate member pivotally attached to said stem and a straight member attached to said arcuate member wherein said straight member is coextensive with the mouth of said hook for closing the mouth of said hook; and a spring for biasing said arm to swing said arm about said first pivot axis.

* * * * *